(12) United States Patent
Wang

(10) Patent No.: US 6,292,203 B1
(45) Date of Patent: Sep. 18, 2001

(54) METHOD OF ENHANCING THE RESOLUTION OF CURSOR MOVEMENT ON THE DISPLAY SCREEN OF A VIDEO DISPLAY SYSTEM

(75) Inventor: Hung-Min Wang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/322,059

(22) Filed: May 27, 1999

(30) Foreign Application Priority Data

Apr. 6, 1999 (TW) .................................................. 88105423

(51) Int. Cl.[7] ...................................................... G09G 5/08

(52) U.S. Cl. ............................................ 345/682; 345/683

(58) Field of Search .................................... 345/121, 123, 345/124, 125, 132, 145; 348/601

(56) References Cited

U.S. PATENT DOCUMENTS 5,982,366 * 11/1999 Nakase .

OTHER PUBLICATIONS

"Smooth Mouse Pointer on Text Base Display", IBM Technical Disclosure Bulletin No. 9212122, Dec. 1992, vol. 35, No. 7, pp. 122–123.*

* cited by examiner

*Primary Examiner*—Jeffery Brier
(74) *Attorney, Agent, or Firm*—Jiawei Huang; J. C. Patents

(57) ABSTRACT

A method is provided for use on an OSD-based (On-Screen Display) video display system, such as a VCD system, a super VCD system, or a DVD system, for the purpose of enhancing the resolution of cursor movement on the display screen of the video 5 display system. This method can help achieve the cursor movement resolution enhancement simply through software modifications without having to modify or add extra hardware to the existing video display system. By this method, the OSD blocks are partitioned into an array of subblocks, one subblock representing one resolution unit for the cursor movement. A number of predesigned sets of fragmented cursor patterns are provided and prestored in the display memory of the video display system. A corresponding set of fragmented cursor patterns can be retrieved for display in specified OSD blocks in response to a particular movement of the cursor over the display screen. When being displayed, these fragmented cursor patterns can be visually combined to appear as a full cursor pattern.

29 Claims, 5 Drawing Sheets

//METHOD OF ENHANCING THE RESOLUTION OF CURSOR MOVEMENT ON THE DISPLAY SCREEN OF A VIDEO DISPLAY SYSTEM

CROSS-REFERENCE TO RELATED APPLICATION

This application claims the priority benefit of Taiwan application serial no. 88105423, filed Apr. 6, 1999, the full disclosure of which is incorporated herein by reference.

BACKGROUND OF THE INVENTION

1. Field of the Invention:

This invention relates to video display technology, and more particularly, to a method for use on an OSD-based (On-Screen Display) video display system, such as a VCD system, a super VCD (SVCD) system, or a DVD system, for the purpose of enhancing the resolution of cursor movement on the display screen of the video display system.

2. Description of Related Art:

FIG. 1 is a functional block diagram, schematically showing the basic system configuration of a conventional video display system 100, such as a VCD system, a super VCD system, or a DVD system. As shown, the video display system 100 includes a digital disc drive 102, a pointing device 108, and a display screen 106. The digital disc drive 102 typically includes an on-screen display (OSD) unit 104 which is capable of displaying the operating status of the overall video display system 100. The OSD unit 104 controls the display screen 106 in such a manner that the display screen 106 is partitioned into an array of blocks (hereinafter referred to as "OSD blocks" throughout this specification), with the rows and columns of these OSD blocks being encoded with ascending code numbers for addressibility to these OSD blocks.

One example of the screen partition scheme is depicted in FIG. 2. As shown, in this example, the display screen 106 represents a primary signal field of 240 horizontal lines by 352 pixels without pixel interpolation. The display screen 106 is partitioned in such a manner that each OSD block has a size of 16 lines by 16 pixels, so that the overall display area can be partitioned into a total of 15×22 OSD blocks, each being used for the display of a certain predesigned symbol (hereinafter referred to as "OSD symbol") therein. Each OSD symbol can be a character or any user-designed graphic pattern. Each of the OSD blocks is labeled with a specific code that allows software to address these OSD blocks for display of selected OSD symbols.

FIG. 3 is a functional block diagram schematically showing detailed inside architecture of the OSD unit 104 used in the video display system 100 of FIG. 1. As shown, the OSD unit 104 includes a microprocessor 302, a primary memory unit 304, a display memory unit 306, and an overlapping circuit 308. The primary memory unit 304 can be either ROM (read-only memory) or RAM (random-access memory), and is used to store a set of OSD symbols that can be selected for display on the display screen 106. During initialization, the microprocessor 302 retrieves the selected OSD symbols from the primary memory unit 304 and then transfers the retrieved OSD symbols to the display memory unit 306. The retrieved OSD symbols can be, for example, the English letters "A", "B", and "C". When display request is received, the overlapping circuit 308 then displays the OSD symbols "A", "B", and "C" along with a cursor mark """↖""" on the display screen 106 as illustrated in FIG. 2. In the case of FIG. 2, for example, the three OSD symbols "A", "B", "C" and the cursor mark """↖""" are respectively displayed in the OSD blocks at the addresses [column 3, row 2], [column 4, row 2], [column 5, row 2], and [column 5, row 3].

In the video display system 100, the provision of the pointing device 108, which can be either a mouse or a trackball, allows additional functionality to the video display system 100 so that the video display system 100 is capable of running video games or educational programs. One drawback to the foregoing video display system 100, however, is that the movement of the cursor would be zigzag-like and discontinuous due to the reason that the cursor can be displayed only from block to block on the display screen 106 and each block is quite large in size that makes the resolution of the cursor movement to be considerably low. This drawback is further depicted illustratively with reference to FIG. 4. Assume the display screen 106 is partitioned into 16×16 OSD blocks, with two of them indicated by the reference numerals 402, 404 in FIG. 4, and the dashed line indicates the intended route for cursor movement. When the user moves the cursor along the intended route, then the cursor will be displayed within the OSD block 402 at a first pointed position at the time $t_0$, within the right-next OSD block 404 at a second pointed position at the time $t_1$, and nevertheless within the same OSD block 404 at a third pointed position at the time $t_2$. As a result, the cursor movement would proceed in a nearly zigzag and discontinuous manner along the intended route, which is quite visually unappealing.

SUMMARY OF THE INVENTION

It is therefore an objective of the invention to provide a method for enhancing the resolution of cursor movement on the display screen of the video display system, which can help the cursor to be moved in a more smooth and continuous manner and positioned at desired locations more precisely.

It is another objective of the invention to provide a method for enhancing the resolution of cursor movement on the display screen of the video display system, which can help enhance the resolution of cursor movement simply through software modifications without having to modify or add extra hardware to the existing video display system In accordance with the foregoing and other objectives of the invention, a novel method is provided for enhancing the resolution of cursor movement on the display screen of a video display system.

The method of the invention is designed for use on a video display system having an OSD unit, a pointing device, and a display screen, for the purpose of enhancing the resolution of cursor movement on the display screen. The display screen is partitioned into an array of OSD blocks. The OSD block is capable of displaying a predesigned OSD symbol. In accordance with the invention, the OSD blocks are partitioned into an array of subblocks. One subblock represents one resolution unit for the cursor movement, and a number of sets of fragmented cursor patterns are predesigned. The set of the fragmented cursor patterns is stored as one OSD symbol that is displayable in one full OSD block of the display screen. The set of the fragmented cursor patterns is retrievable for display in response to a particular movement of the cursor over the display screen and visually combinable into a full cursor pattern when being displayed at corresponding OSD blocks. In response to a cursor-moving control from the pointing device, the method first detects which one of the subblocks the pointing device is currently pointing at and in which direction the cursor is being moved. Then based on the detection results, the corresponding set of fragmented cursor patterns are selected and then displayed respectively at corresponding OSD blocks on the display screen to be visually combined to appear as a full cursor pattern.

The invention can enhance the resolution of cursor movement on the display screen by first partitioning the OSD blocks into the subblocks. One subblock represents one resolution unit for the cursor movement. The fragmented cursor patterns are displayable in one full of the OSD blocks on the display screen, and the set of the fragmented cursor patterns is visually combinable into a full cursor pattern when displayed at the corresponding OSD blocks in response to a particular movement of the cursor over the display screen. Therefore, the cursor can be more precisely moved in a more smooth and continuous manner, and this can be done by software modifications without having to modify or add extra hardware to the existing video display system.

In accordance with another aspect of the invention, a video display system with cursor movement resolution enhancement is provided. The video display system comprises an OSD unit, a pointing device, and a display screen. The OSD unit further includes a microprocessor, a primary memory unit, a display memory unit, and an overlapping circuit. The display screen is partitioned into an array of OSD blocks. The OSD blocks are capable of displaying a predesigned OSD symbol. Furthermore, the OSD blocks are partitioned into an array of subblocks. One subblock represents one resolution unit for the cursor movement. The display memory unit prestores a number of predesigned sets of fragmented cursor patterns. The fragmented cursor pattern is stored as one OSD symbol that is displayable in one full of the OSD blocks on the display screen. The set of the fragmented cursor patterns is retrievable for display in response to a particular movement of the cursor over the display screen and visually combinable into a full cursor pattern when being displayed at corresponding OSD blocks. In response to cursor control from the pointing device, the microprocessor first detects which one of the subblocks the pointing device is currently pointing at and in which direction the cursor is being moved. Based on the detection results, the microprocessor then retrieves the corresponding set of fragmented cursor patterns from the display memory unit and displays the selected set of fragmented cursor patterns respectively at the corresponding OSD blocks on the display screen. When displayed, these fragmented cursor patterns can be visually combined to appear as a full cursor pattern. By the invention, the resolution of cursor movement can be enhanced just through software modifications without having to modify or add extra hardware to the existing video display system.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
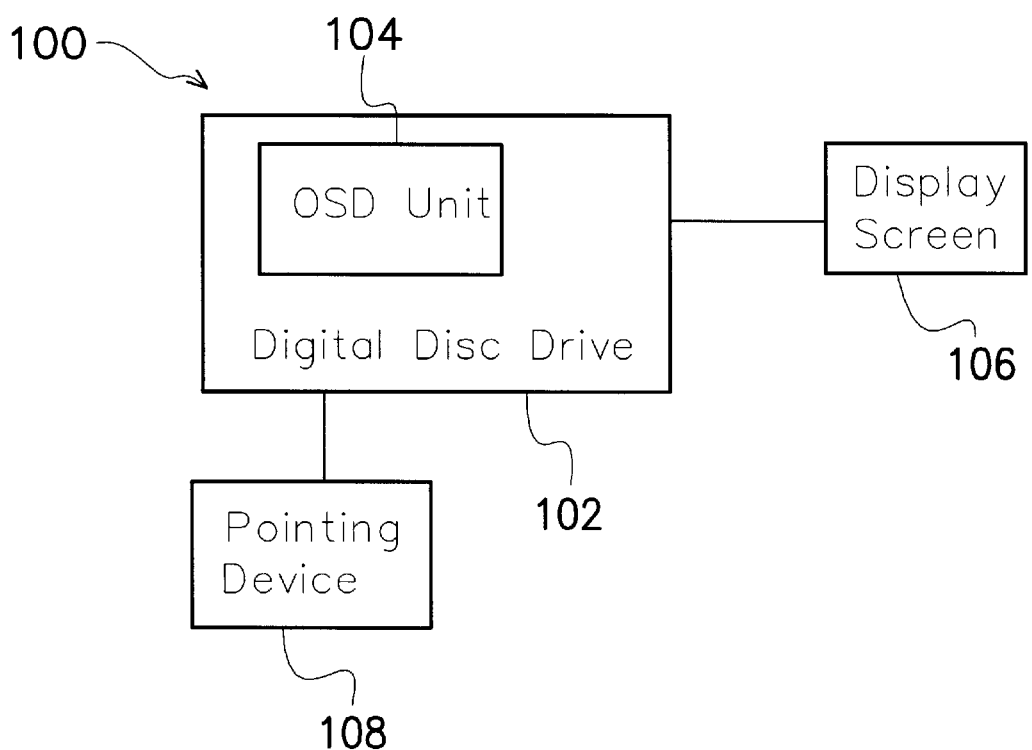
FIG. 1 is a functional block diagram schematically showing the basic system configuration of a typical video display system, according to the invention.
Figure 2:
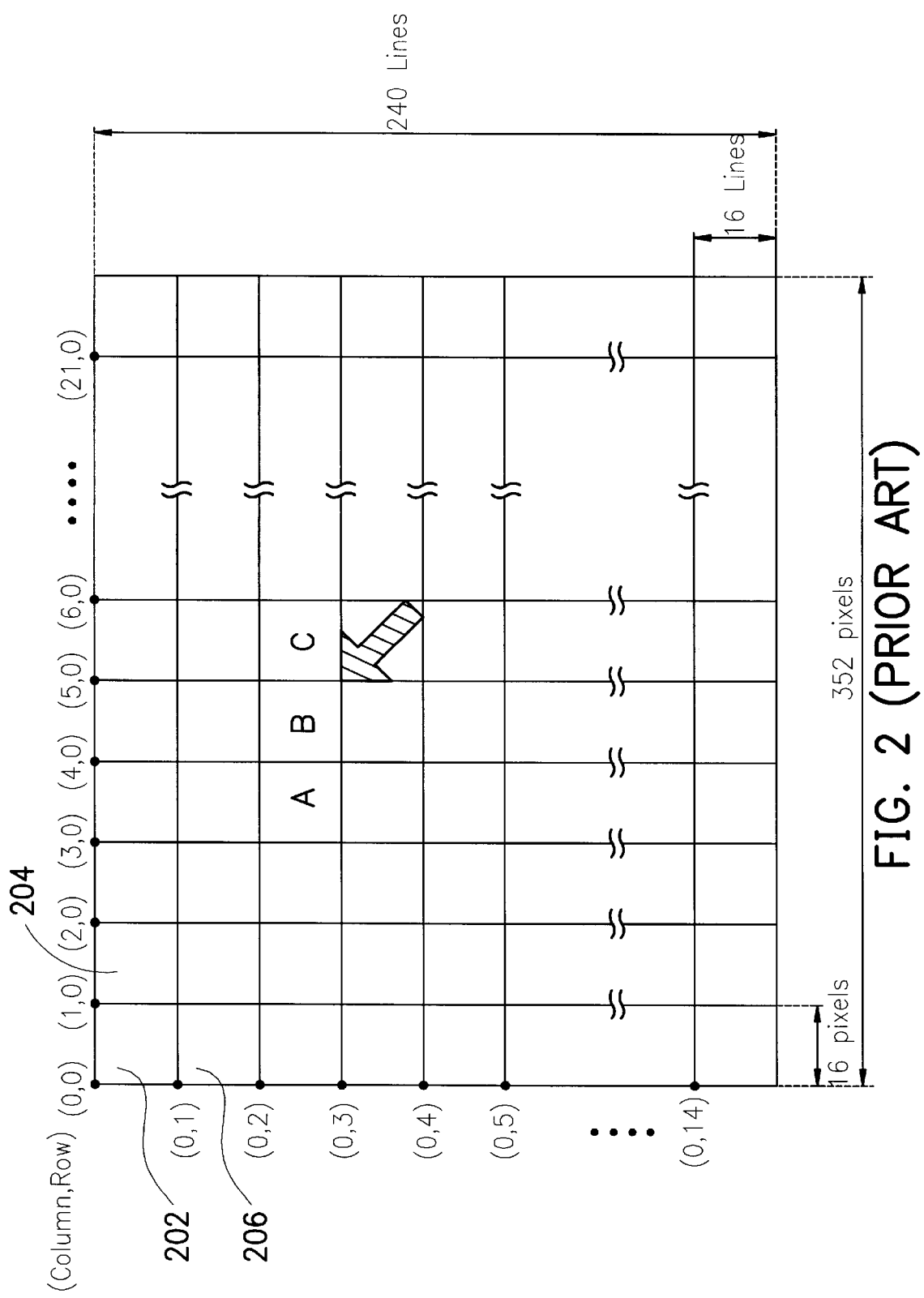
FIG. 2 is a functional diagram, schematically showing an example of a display area scheme utilized by the video display system of FIG. 1.
Figure 3:
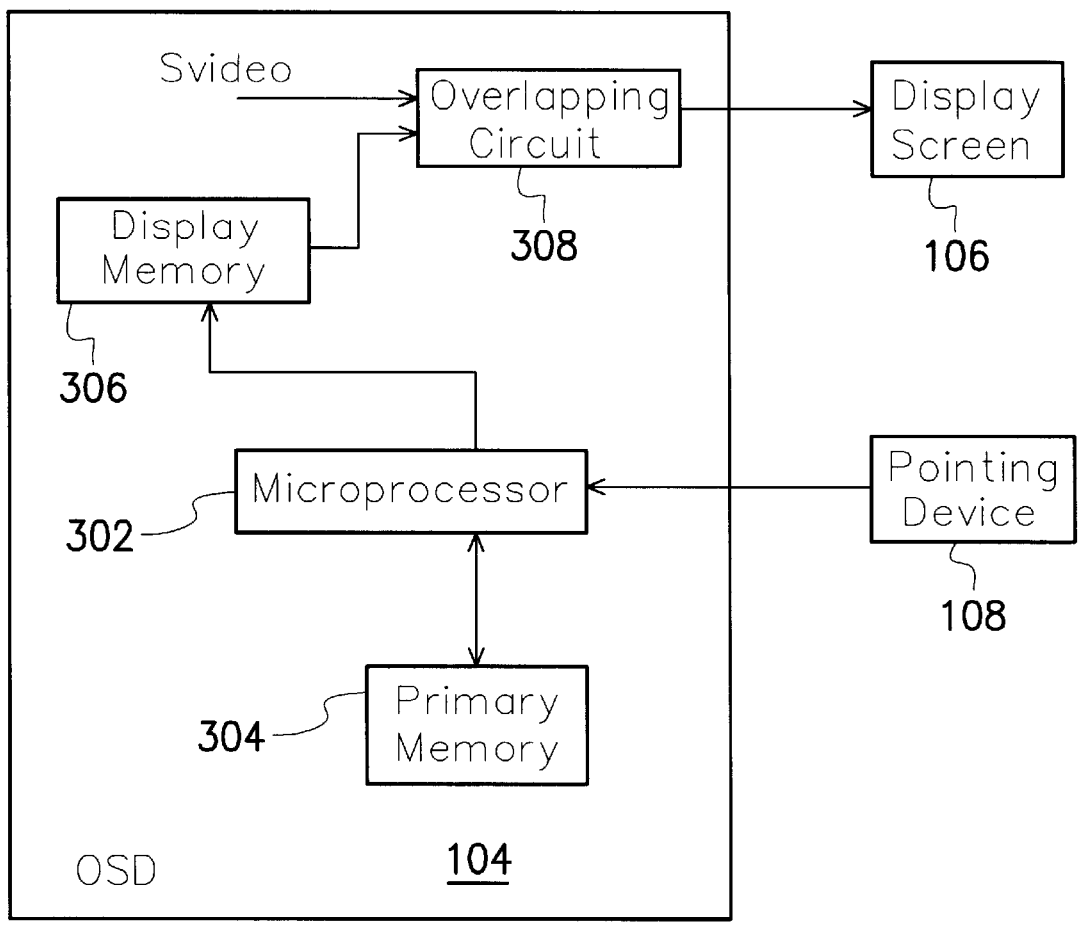
FIG. 3 is a functional block diagram, schematically showing particularly more detailed inside architecture of the OSD unit shown in the video display system of FIG. 1.
Figure 4:
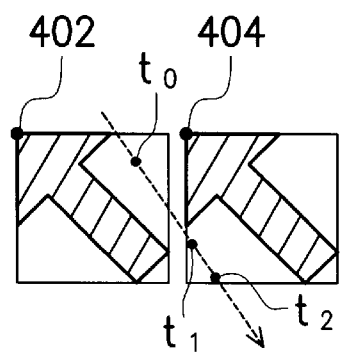
FIG. 4 is a drawing, schematically depicting the zigzag-like and discontinuous cursor movement when using the video display system of FIG. 1.

The invention provides a method for enhancing the resolution of cursor movement on the display screen of a video display system simply through software modifications without having to modify or add extra hardware to the existing video display system.

In the following preferred embodiment of the invention, the method used on the video display system 100 is depicted in FIGS. 1–4 to demonstrate that the invention can be implemented just through software modifications to the video display system 100 without having to modify or add extra hardware to the video display system 100. The video display system 100 includes a digital disc drive 102, a pointing device 108, and a display screen 106; and the digital disc drive 102 further includes an OSD unit 104 which is com-posed of a microprocessor 302, a primary memory unit 304, a display memory unit 306, and an overlapping circuit 308.

The following preferred embodiment of the invention is intended to enhance the resolution of cursor movement on the display screen 106 in horizontal and vertical directions by a factor of 2, but it is to be noted herein that the invention allows the resolution to be enhanced by any factor equal or greater than 2, even though the greater the factor, the more complex the software implementation. Broadly speaking, in order to achieve this, the OSD blocks are partitioned horizontally by a first predetermined number and verti5t cally by a second predetermined number into a plurality of subblocks. In the following preferred embodiment, the first and second predetermined numbers are both equal to 2. This preferred embodiment is disclosed in full details in the following with reference to FIGS. 5A–5D.

Fundamentally, the invention can help enhance the resolution of cursor movement on the display screen 106 by first partitioning each OSD block into a plurality of subblocks each representing one resolution unit for the cursor movement. Furthermore, a number of predesinged sets of fragmented cursor patterns are provided; each of the fragmented cursor patterns is displayable in one full OSD block on the display screen, and each set of fragmented cursor patterns are visually combinable into a full cursor pattern when displayed at corresponding OSD blocks in response to a particular movement of the cursor over the display screen.

Figure 5A:
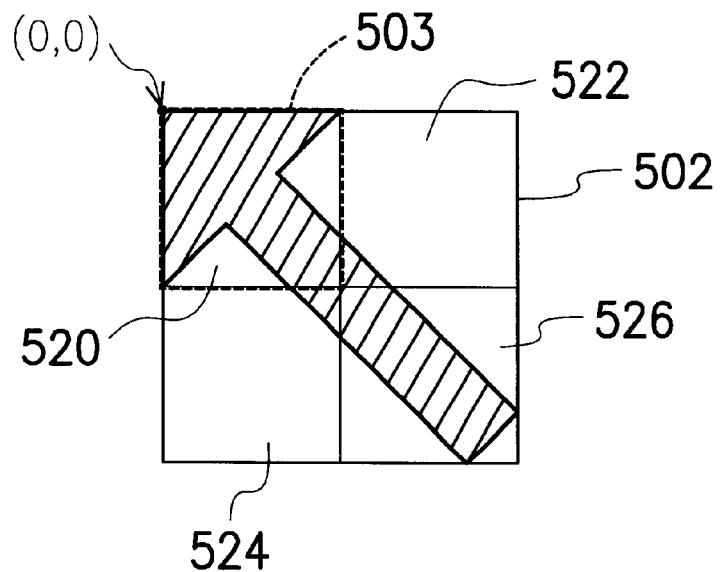
FIG. 5A a drawing, schematically showing the display of a full cursor pattern in a single OSD block.

In response to a cursor-moving control from the pointing device, the method first detects which one of the subblocks the pointing device is currently pointing at and in which direction the cursor is being moved. Then, based on the detection results, the corresponding set of the fragmented cursor patterns is retrieved and then displayed respectively at the corresponding OSD blocks on the display screen to be visually combined to form a cursor pattern. FIG. 5A a schematic diagram showing the display of a full cursor pattern in a single OSD block 502. This cursor pattern is designed as a single OSD symbol that can be displayed in the OSD block 502. In this preferred embodiment, the cursor pattern uses the full size of the OSD block 502 for its design, but it can also be smaller in size than the OSD block 502. In this preferred embodiment, for example, the invention is used to allow an increase in the resolution of the cursor movement by 2; and accordingly, the OSD block 502 is partitioned by 2 horizontally and by 2 vertically into four subblocks 520, 522, 524, 526, each subblock representing one resolution unit for the cursor movement. When the pointed position is located within the upper-left subblock (the area enclosed by the dashed box indicated by the reference numeral 503), the OSD symbol representing a full cursor pattern is retrieved for display in the entire OSD block 502.

Figure 5B:
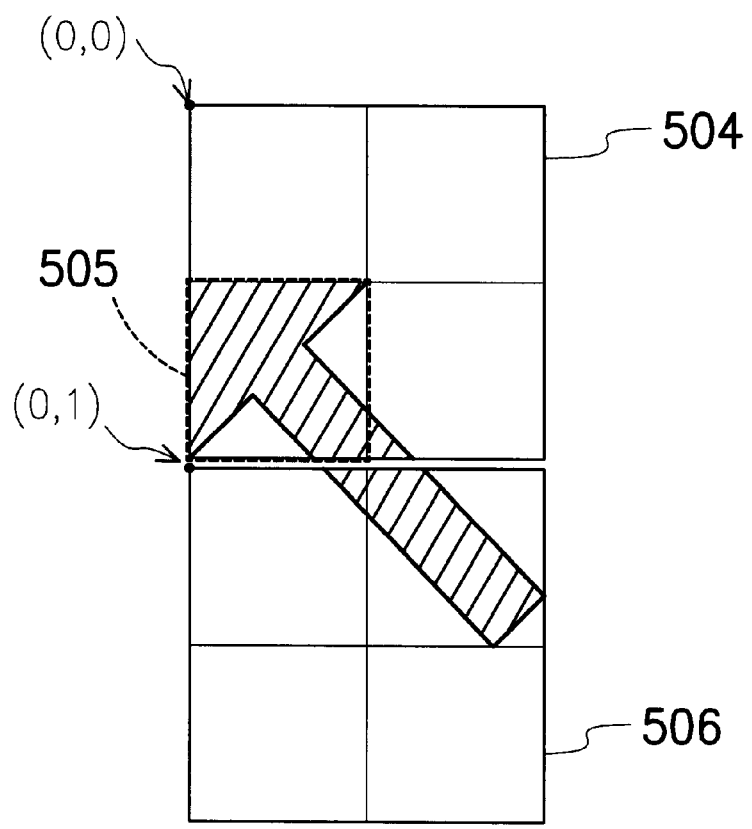
FIG. 5B a drawing, schematically showing the display of two fragmented cursor patterns in two OSD blocks that can be visually combined to form to a full cursor pattern when the cursor is being moved in the downward direction.

FIG. 5B is a schematic diagram showing the case of moving the cursor downwards by one resolution unit from the current subblock to the beneath one (here indicated by the reference numeral 505). As shown, in this case a cursor pattern made of two fragments is displayed in the current OSD block 504 and the beneath OSD block 506, respectively. When being displayed, these two fragments of the cursor pattern in the OSD blocks 504, 506 are combined and displayed so as to form a full cursor pattern, as illustrated in FIG. 5B.

Figure 5C:
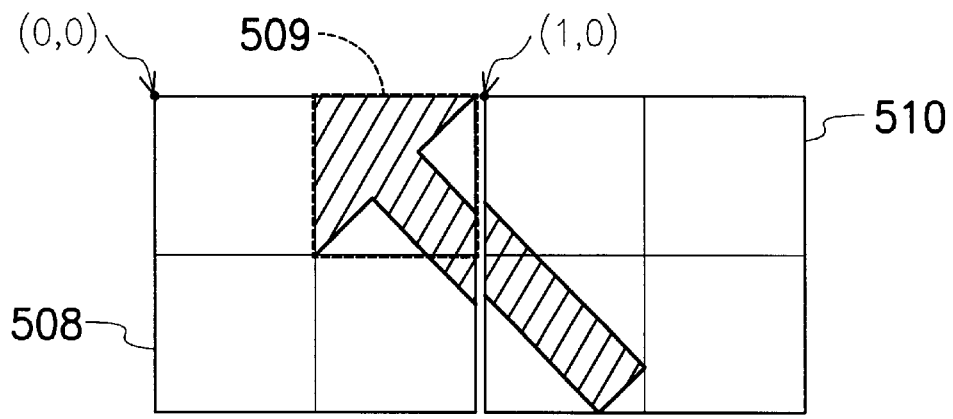
FIG. 5C a drawing, schematically showing the display of two fragmented cursor patterns in two OSD blocks that can be visually combined to form a full cursor pattern when the cursor is being moved in the horizontal direction.

FIG. 5C is a schematic diagram showing the case of moving the cursor rightwards by one resolution unit from the current subblock to the right-next subblock (here designated by the reference numeral 509). As shown, in this case, a cursor pattern composed of two fragments, which are fragmented in a different manner from the case of FIG. 5B, is displayed in the current OSD block 508 and the right-next OSD block 510, respectively. When being displayed, these two fragments of the cursor pattern are separately displayed in the OSD blocks 508, 510 but are combined together so as to form a full cursor pattern, as illustrated in FIG. 5C.

Figure 5D:
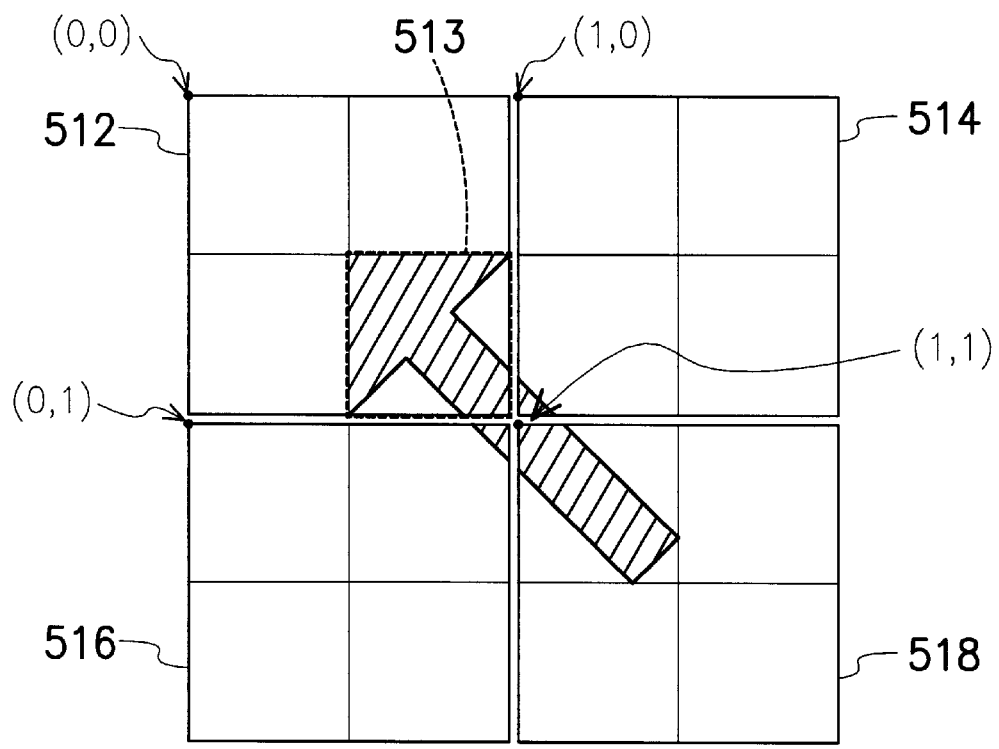
FIG. 5D a drawing, schematically showing the display of four fragmented cursor patterns in four OSD blocks that can be visually combined to form a full cursor pattern when the cursor is being moved in the diagonal direction.

FIG. 5D is a schematic diagram showing the case of moving the cursor diagonally by one resolution unit from the current subblock to the lower-right one (here designated by the reference numeral 514). As shown, in this case, a cursor pattern composed of four fragments is displayed in the OSD blocks 512, 514, 516, and 518, respectively. When being displayed, these four fragments of the cursor pattern are combined and respectively displayed in the OSD blocks 512, 514, 516, and 518 so as form a full cursor pattern, as illustrated in FIG. 5D.

When implemented on the video display system 100 of FIG. 1, the predesigned sets of fragmented cursor patterns are stored in the display memory unit 306, each set being retrievable in response to a particular movement of the cursor over the display screen 106, which can be detected by the microprocessor 302. In the case of FIGS. 5A–5D, for example, when the microprocessor 302 detects that the cursor is being moved vertically by one resolution unit, then it will retrieve the two fragments of the cursor patterns shown in FIG. 5B from the display memory unit 306 and then display them respectively in the current OSD block and the next one in the moving direction; whereas, when the microprocessor 302 detects that the cursor is being moved horizontally, then it will retrieve the two fragments of the cursor pattern shown in FIG. 5C from the display memory unit 306 and then display them respectively in the current OSD block and the next one in the moving direction; and whereas, when the microprocessor 302 detects that the cursor is being moved diagonally, it will retrieve the four fragments of the cursor patterns shown in FIG. 5D from the display memory unit 306 and then display them respectively in the current OSD block and the neighboring three OSD blocks in the moving direction.

The invention has been described using exemplary preferred embodiments. How-ever, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for use on a display system having an OSD unit, a pointing device, and a display screen, for the purpose of enhancing a resolution of a cursor movement on the display screen, the display screen being partitioned into an array of OSD blocks, the OSD blocks being capable of displaying a predesigned OSD symbol; the method comprising:

partitioning the OSD blocks into an array of subblocks, wherein one of the subblocks represents one resolution unit for the cursor movement;

providing a set of fragmented cursor patterns, the fragmented cursor patterns being stored as one OSD symbol with respect to one of the subblocks in corresponding one of the OSD blocks and being combined to form a cursor pattern for displaying on the display screen, in which the fragmented cursor patterns are retrievable for displaying in a specified one of the OSD blocks in response to a particular movement of the cursor over the display screen;

in response to a cursor-movement control from the pointing device, detecting which one of the subblocks the pointing device is currently pointing at and in which direction the cursor is being moved;

based on the detection results, retrieving the corresponding set of fragmented cursor patterns; and displaying the retrieved set of fragmented cursor patterns respectively at desired one of the OSD blocks on the display screen to be visually combined to appear as a full cursor pattern.

2. The method of claim 1, wherein the pointing device is a mouse.

3. The method of claim 1, wherein the pointing device is a trackball.

4. The method of claim 1, wherein the cursor pattern is smaller in size than the OSD blocks.

5. The method of claim 1, wherein the OSD blocks are partitioned horizontally by a first predetermined number and vertically by a second predetermined number into the subblocks.

6. The method of claim 1, wherein the display system is a VCD system.

7. The method of claim 1, wherein the display system is a super VCD system.

8. The method of claim 1, wherein the video display system is a DVD system.

9. A method for use on a video display system having an OSD unit, a pointing device, and a display screen, with the OSD unit further having a microprocessor, a primary memory unit, a display memory unit, and an overlapping circuit, for the purpose of enhancing a spatial resolution of a cursor movement on the display screen, the display screen being partitioned into an array of OSD blocks, the OSD blocks being capable of displaying a predesigned OSD symbol, the method comprising the steps of:

partitioning the OSD blocks into an array of subblocks, wherein one of the subblocks represents one resolution unit for the cursor movement;

providing a set of fragmented cursor patterns, the fragmented cursor patterns, with respect to one of the subblocks, being stored in the display memory unit as one OSD symbol that is displayable in one full of the OSD blocks of the display screen, and the fragmented cursor patterns being retrievable for display in corresponding one of the OSD blocks in response to a particular movement of the cursor over the display screen and visually combinable into a cursor pattern when being displayed in the corresponding OSD blocks;

in response to a cursor-movement control from the pointing device, activating the microprocessor to detect which one of the subblocks the pointing device is currently pointing at and in which direction the cursor is being moved;

based on the detection results, activating the microprocessor to retrieve the corresponding set of fragmented cursor patterns from the display memory unit; and transferring the retrieved set of fragmented cursor patterns respectively through the overlapping circuit to the display screen to be displayed at the corresponding OSD blocks on the display screen to form the cursor pattern through combination of the fragmented cursors patterns.

10. The method of claim 9, wherein the pointing device is a mouse.

11. The method of claim 9, wherein the pointing device is a trackball.

12. The method of claim 9, wherein the cursor pattern is smaller in size than the OSD blocks.

13. The method of claim 9, wherein the OSD b locks a re partitioned horizontally by a first predetermined number and vertically by a second predetermined number into the subblocks.

14. A video display system with cursor movement resolution enhancement, comprising an OSD unit, a pointing device, and a display screen, wherein the display screen is partitioned into an array of OSD blocks, the OSD blocks being capable of displaying a predesigned OSD symbol, and being further partitioned into an array of subblocks, one of the subblocks representing one resolution unit for a cursor movement, the OSD unit pre-stores at least one predesigned set of fragmented cursor patterns, the fragmented cursor patterns, with respect to one of the subblocks, being stored as one OSD symbol that is displayable in one full of the OSD blocks on the display screen, and the fragmented cursor patterns being retrievable for display in response to a particular movement of the cursor over the display screen and visually combinable into a full cursor pattern when being displayed at the corresponding OSD blocks, in response to cursor control from the pointing device, the OSD unit detects which one of the subblocks the pointing device is currently pointing at and in which direction the cursor is being moved; and based on the detection results, the OSD unit selects the corresponding set of fragmented cursor patterns and then displays the selected set of fragmented cursor patterns respectively at the specified OSD blocks on the display screen to be visually combined to appear as a full cursor pattern.

15. The video display system of claim 14, wherein the pointing device is a mouse.

16. The video display system of claim 14, wherein the pointing device is a trackball.

17. The video display system of claim 14, wherein the cursor pattern is smaller in size than the OSD blocks.

18. The video display system of claim 14, wherein the OSD blocks are partitioned horizontally by a first predetermined number and vertically by a second predetermined number into the subblocks.

19. The video display system of claim 14, which is a VCD system.

20. The video display system of claim 14, which is a super VCD system.

21. The video display system of claim 14, which is a DVD system.

22. A video display system with cursor movement resolution enhancement, comprising:

an OSD unit, a pointing device, and a display screen, with the OSD unit further including a microprocessor, a primary memory unit, a display memory unit, and an over-lapping circuit, wherein the display screen is partitioned into an array of OSD blocks, the OSD blocks are capable of displaying a predesigned OSD symbol, the OSD blocks are further partitioned into an array of subblocks, one of the subblocks represents one resolution unit for a cursor movement, the display memory unit pre-stores at least one predesigned set of fragmented cursor patterns, the fragmented cursor patterns are stored in the display memory unit as one OSD symbol that is displayable in one full OSD block of the display screen, and the set of the fragmented cursor patterns is retrievable for display in response to a particular movement of the cursor over the display screen and is combined to form a cursor pattern when being displayed at the corresponding OSD blocks, in response to a cursor control from the pointing device, the microprocessor detects which one of the subblocks the pointing device is currently pointing at and in which direction the cursor is being moved, and based on the detection results, the microprocessor retrieves the corresponding set of fragmented cursor patterns and then displays the retrieved set of the fragmented cursor patterns respectively at the specified OSD blocks on the display screen to be visually combined to form a cursor pattern.

23. The video display system of claim 22, wherein the pointing device is a mouse.

24. The video display system of claim 22, wherein the pointing device is a trackball.

25. The video display system of claim 22, wherein the cursor pattern is smaller in size than the OSD blocks.

26. The video display system of claim 22, wherein the OSD blocks are partitioned horizontally by a first predetermined number and vertically by a second predetermined number into the subblocks.

27. The video display system of claim 22, which is a VCD system.

28. The video display system of claim 22, which is a super VCD system.

29. The video display system of claim 22, which is a DVD system.

* * * * *